United States Patent [19]

Gionet

[11] Patent Number: 4,671,571

[45] Date of Patent: Jun. 9, 1987

[54] EASY ENTRY SEAT ADJUSTER SLIDE

[75] Inventor: Edmond R. Gionet, Royal Oak, Mich.

[73] Assignee: General Motors Corporation, Detroit, Mich.

[21] Appl. No.: 874,690

[22] Filed: Jun. 16, 1986

[51] Int. Cl.$^4$ ............................................... A47C 1/02
[52] U.S. Cl. ..................................... 297/341; 248/429
[58] Field of Search ............... 297/341, 311, 452, 342, 297/343, 317, 318; 248/393, 429, 430

[56] References Cited

U.S. PATENT DOCUMENTS

| | | | |
|---|---|---|---|
| 3,853,373 | 12/1974 | Corbett | 297/341 |
| 3,931,995 | 1/1976 | Arai | 297/341 |
| 4,065,178 | 12/1977 | Carella et al. | 297/341 |
| 4,143,911 | 3/1979 | Sakakibara | 297/341 |
| 4,159,147 | 1/1979 | Kiyomitsu et al. | 297/341 |
| 4,422,690 | 12/1983 | Kopich | 297/341 |
| 4,423,904 | 1/1984 | Crawford | 297/341 |
| 4,440,442 | 3/1984 | Drouillard | 297/341 |
| 4,569,557 | 2/1986 | Goforth | 297/341 |

Primary Examiner—James T. McCall
Attorney, Agent, or Firm—Ernest E. Helms

[57] ABSTRACT

The present invention provides an easy entry seat adjuster along with a memory. The present invention is highly useful when utilized for the front seat in a two row seat two door vehicle wherein the bending of the front seat back forward allows the front seat to move to its most forward position. After utilization of the easy entry feature, pushing back on the front seat will automatically return the front seat in its preselected position without further adjustment by the front seat occupant.

5 Claims, 7 Drawing Figures

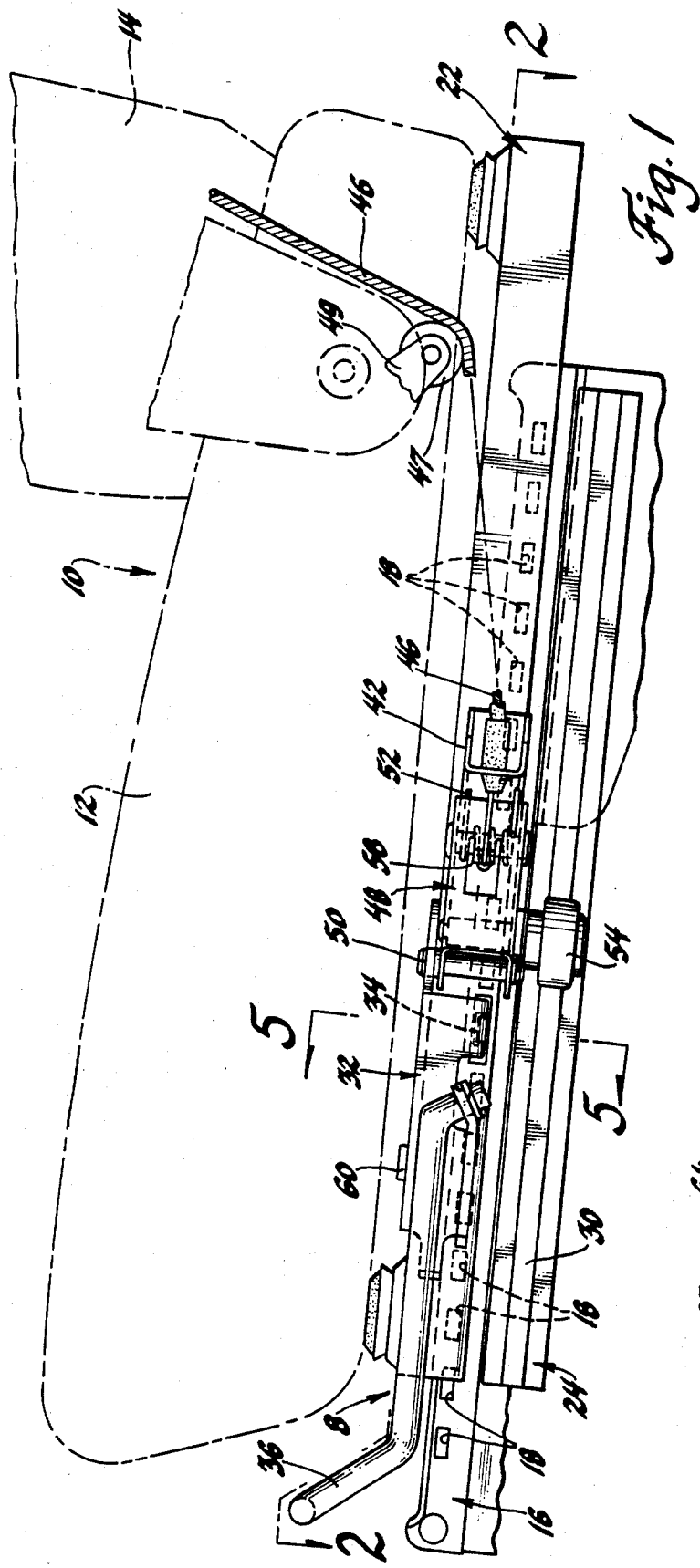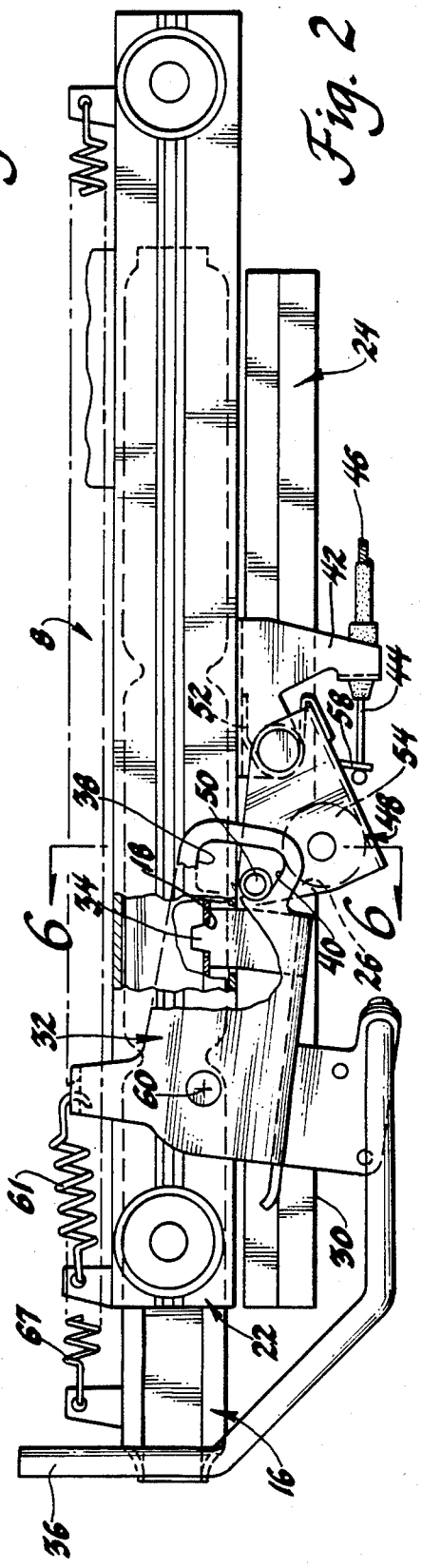

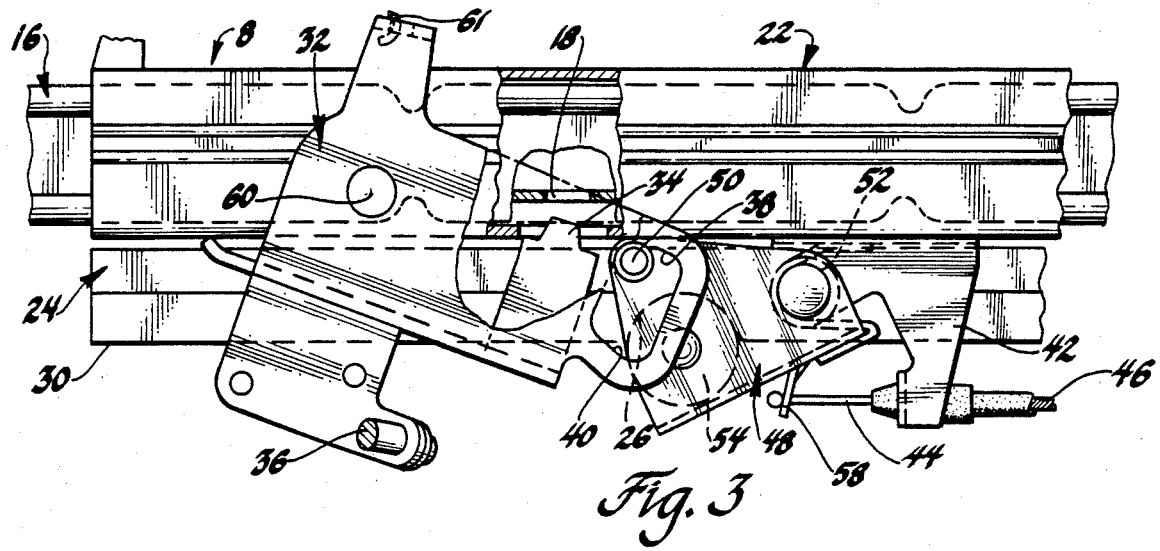
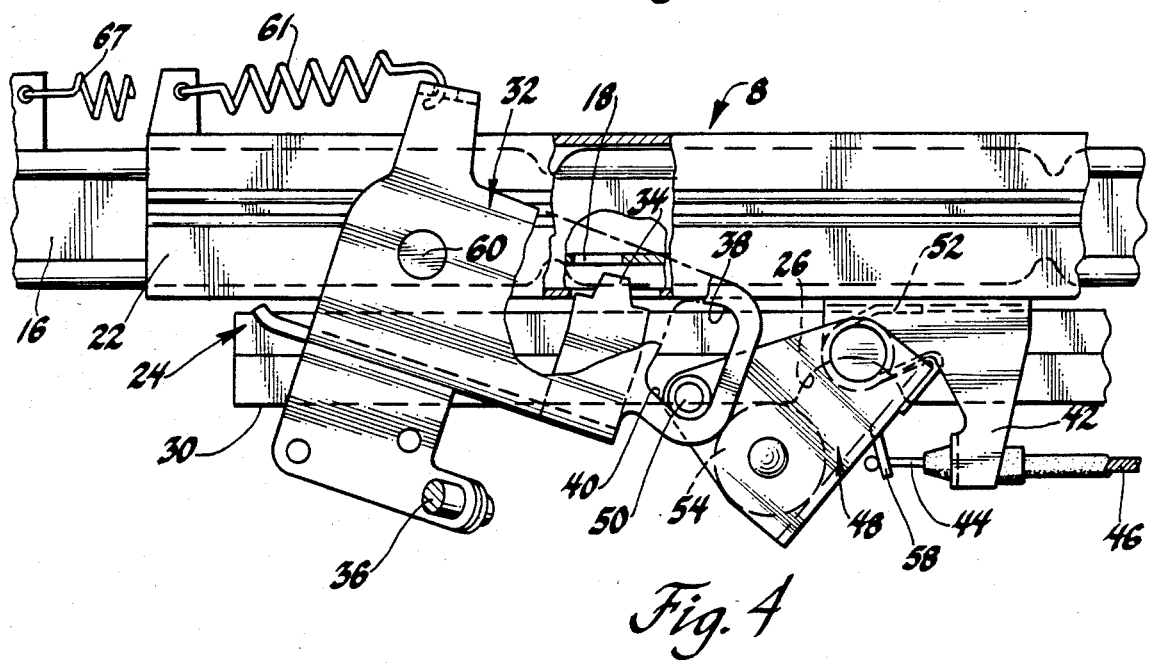
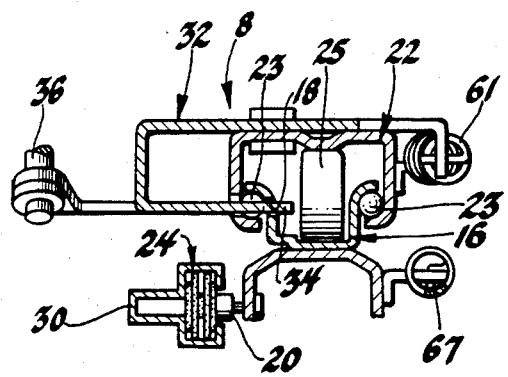
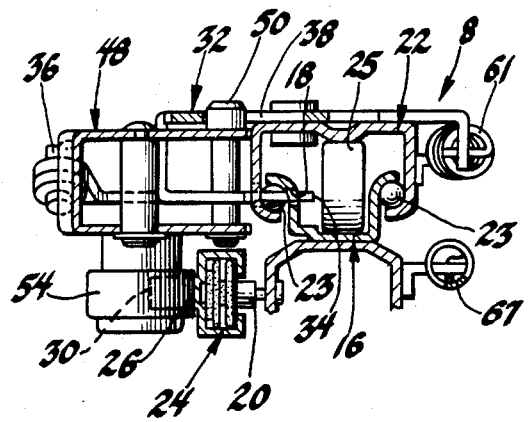

EASY ENTRY SEAT ADJUSTER SLIDE

FIELD OF THE PRESENT INVENTION

The present invention relates to vehicle seat adjuster slides. More particularly the present invention relates to vehicle seat adjuster slides having an easy entry feature wherein by a signal the seat is automatically positioned to an extreme forward or rearward position to facilitate entry or exit of the vehicle. Still more particularly the present invention relates to easy entry seat adjuster slides as hereintofore described wherein the slide also has a memory to return the seat to its preselected adjusted position without further adjustment by the seat occupant.

DISCLOSURE STATEMENT

Typically automotive vehicles have a front and rear row of seating. It is common to provide automotive vehicles with just one door per side (two door) wherein the front and rear seat occupants utilize the same door to enter or exit the vehicle. To allow the rear seat occupant to enter the vehicle, the front seat back pivots forward to provide a greater opening. To increase the room for entry into the vehicle further, the tilting of the front seat back also activates a biasing force to move the front seat to an extreme forward position. After the rear seat occupant is seated, the front seat back is returned to its upright position. It is then desirable for the front seat to return to the prior preselected position by being pushed back by the front seat occupant without requiring the front seat occupant to readjust the seat.

Examples of easy entry vehicle seat adjuster slides may be found in commonly assigned Corbett U.S. Pat. Nos. 3,853,373, Carella et al 4,065,178, and Kopich 4,422,690.

The present invention provides an easy entry vehicle seat adjuster slide which provides an alternative to the adjuster slides noted above.

It is an object of the present invention to provide an easy entry vehicle adjuster slide wherein the tilting of the vehicle seat automatically allows the vehicle seat to be moved to an easy entry position. It is another object of the present invention to provide an easy entry vehicle seat adjuster slide wherein after the seat is placed in an easy entry position, the seat can be returned to its prior preselected position without adjustment by the seat occupant. It is a further object of an embodiment of the present invention to provide a vehicle seat adjuster slide with an easy entry feature with a memory wherein the signal which activates the easy entry feature has an allowable over travel.

It is also an object of the present invention to provide an easy entry vehicle seat adjuster slide activated upon the tilting of the vehicle seat back forward and wherein the adjuster slide also has a memory to return the seat from the easy entry position to the preselected seating position, the adjuster slide including a combination of a floor channel for mounting the seat to the vehicle having a plurality of notches along its length and mounting lugs at its opposite ends, a seat channel for attachment with the seat slidably mounted on the floor channel, a first latch connected with the seat channel being biased to a first position to engage with a notch of the seat channel at a preselected position and having a second position allowing relative movement between the floor channel and the seat channel, and the first latch also having a cammed surface slot, a memory bar mounted on said mounting lugs alternatively fixed with the seat channel and the floor channel having a semicircular indention and a planar surface, a cable mounted to the seat back being translated by tilting of the vehicle seat back and, a second latch connected with the seat channel having a cam follower captured within the first latch slot, and the second latch in a first biased position having a roller in contact with the memory bar semicircular indention when said memory bar is affixed to the seat channel and the second latch in its second position having its roller in contact with the memory bar planar surface when the memory bar is affixed with the floor channel, and whereby the second latch is activated by the cable and the initial translation of the cable causes the second latch cam follows to move the first latch to the first latch second position and further translation of the cable does not cause further movement of the first latch.

Other objects, desires and advantages of the present invention will become more apparent to those skilled in the art as the nature of the invention is better understood from the accompanying drawings and a detailed description.

BRIEF DESCRIPTION OF THE DRAWINGS

FIG. 1 is a partial side elevational view of a seat utilizing an embodiment of the adjuster slide of the present invention;

FIG. 2 is a top elevational view of a vehicle seat adjuster slide illustrated in FIG. 1;

FIG. 3 is a partial top elevational view of the vehicle seat adjuster, slide illustrated in FIG. 2 during regular adjustment of the seat;

FIG. 4 is a partial top elevational view of the vehicle seat adjuster slide illustrated in FIG. 2 during easy entry operation;

FIG. 5 is a sectional view of the vehicle seat adjuster slide taken generally along the plane indicated by lines 5—5 in FIG. 1;

FIG. 6 is a sectional view of the vehicle seat adjuster slide taken generally along the plane indicated by lines 6—6 in FIG. 2.

DETAILED DESCRIPTION OF THE DRAWINGS

Figure 7:
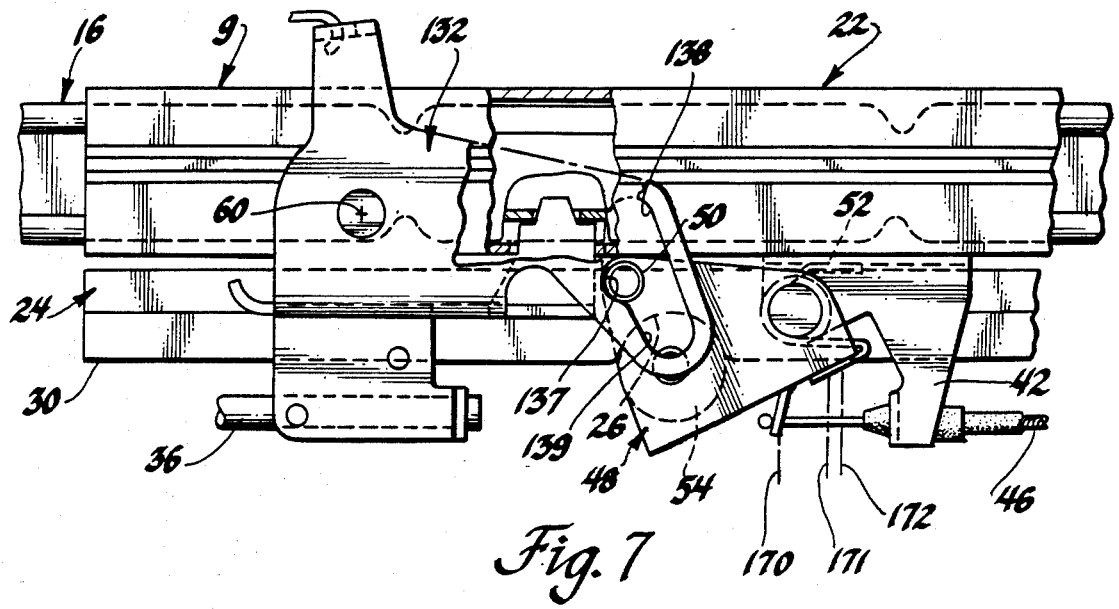
FIG. 7 is a partial top elevational view of an alternative embodiment of the vehicle seat adjuster slide of the present invention.

Referring to FIGS. 1, 2, 5 and 6 the vehicle seat 10 has a femur member 12 with a pivotally connected seat back 14. The seat 10 is mounted to the vehicle by the adjuster slider's 8 floor plate 16 hereafter referred to as the floor channel 16. Along the length of floor channel 16 is a plurality of slotted apertures 18. At the fore and aft ends of the floor channel 16 are extending mounting lugs 20 (illustrated in FIG. 5). The mounting lugs utilized can be of the type described in Doveinis et al U.S. Pat. No. 3,466,802 commonly assigned.

Slidably mounted via ball bearing 23 and roller 25 on top of floor channel 16 is a top plate 22 hereinafter referred to as the seat channel. The seat channel 22 provides the means of attachment of the seat 10 to the adjuster slide 8. Frictionally mounted to the lugs 20 is the memory bar 24. The memory bar 24 will typically have a cross-sectional T-shape with a semicircular indention 26 in its planar surface 30.

Referring to FIGS. 1 through 6, a first latch 32 is provided which is pivotally connected with the seat channel 22 at point 60. First latch 32 biased by spring 61 has a locking male 34 engagement member which is biased to fit within one of the slots 18 of the floor channel 16 to restrain relative motion between the floor channel 16 and the seat channel 22. The first latch 32 biased engagement can be overcome via lever 36 which is typically manually operable. The first latch 32 also at its opposite end has a slot 38 with a cammed surface 40.

Fixably connected with the seat channel 22 rearward of the first latch 32 is a release support 42. The release support 42 holds an activator 44 signaled by a cable 46. Cable 46 is mounted to seat 10 and can be directly translated by a seat back latching mechanism (not shown) which is activated to allow seat back 14 to pivot forward. Alternatively the cable 46 may be translated by the actual pivoting forward of seat back 14 pulling cable 46 around guide pulley 47. Guide pulley 47 is rotatably mounted on arm 49.

Connected with seat channel 22 via a pivotal connection with release support 42 is a second latch 48. The second latch 48 has a pin or cam follower 50 which is captured within the slot 38 of the first lever 32. The second latch 48 is biased by a spring 52 to a first position (illustrated in FIG. 2) allowing the first lever 32 to be in its first (locking) position.

Rotatively mounted on the second latch 48 is a roller 54. The roller 54 makes contact alternatively with indention 26 or planar surface 30 of the memory bar 24. In the second latch 48 first position, roller 54 nests in the semicircular indention 26.

The activator 44 which is controlled by the cable 46 is also connected with the second latch 48 via second latch arm 58. In operation a pull upon the cable 46 (illustrated in FIG. 3) pulls against the force of the biasing spring 52 allowing the roller 54 to leave the indention surface 26 of the memory bar (illustrated in FIG. 4) and roll on the planar surface 30 of the memory bar 24. The cam follower 50 of the second latch will pull the first latch 32 into a disengaged (second) position and a spring 67 will cause the seat 10 via the seat channel 22 to move to an extreme, typically forward, easy entry position.

The first latch 32 (during the easy entry operation) is continually held in a non-engaged position by cam follower 50. The roller 54 of the second latch is rolling upon the memory bar planar surface 30, therefore the second latch 48 cannot return to the first position to allow the first latch 32 to re-engage. The memory bar 24 at this point is fixed with respect to floor channel 16 by the frictional engagement of the mounting lugs 20 with the memory bar 24.

After the rear seat occupant has either entered or exited the vehicle the seat back 14 will be returned to its original upright position. Pushing the seat 10 backwards by the seat occupant will cause the roller 54 to return to the semicircular indention 26. Roller 54 will now remain in indention 26 due to the force of spring 52 since cable 46 is no longer pulling on arm 58. The first latch 32, which is biased for engagement, returns to its engaged first position. Since the memory bar is stationary in regards to the floor channel 16 the seat 10 automatically returns to the prior preselected position of the seat occupant.

When normal adjustment of the seat 10 is desired (FIG. 2) the occupant will activate the first latch 32 by hand via lever 36. Due to the shape of the slot 38 cammed surface 40, the cam follower's 50 (and second latch 48) position will remain unchanged. Relative movement is now allowed between the seat channel 22 and the floor channel 16.

As the seat channel 22 moves relative to the floor channel 16 the first latch 32 and the release support 42 are also brought along. Since the roller 54 of the second latch is in the indention 26 the memory bar 24 is now fixed to the seat channel 22. The fixation of the memory bar 24 with the seat channel 22 overcomes the frictional engagement of the memory bar 24 with lugs 20, therefore the memory bar 24 slides along with the seat channel 22 to the seat channel's new selected position. Upon the seat reaching its new selected position, first latch 32 will re-engage and the memory bar 24 will again be frictionally held by the lugs 20. Therefore, after reactivation of the easy entry function, the seat 10 will return to the newly selected position.

Referring to FIG. 7 an alternative embodiment of the present inventive seat adjuster slide is provided with a modified first latch 132. In this embodiment parts similar to FIGS. 1-6 embodiment are given common reference numerals. First latch 132 has a cammed surface slot 138 having a surface 137 for initial engagement and a cammed surface 139 for a dwell segment. The shape of the cammed surfaces 137 and 139 allows the cam follower 50 to initially cause the first latch 132 to release upon the initial pull or translation of the cable 46 from point 170 to 171 (active area). However, if the cable 46 is translated further (dwell area) to point 172 the first latch 132 reaches a dwell segment wherein the pivotal movement of the first latch 132 about point 60 is diminished. The above arrangement allows for the travel of the cable 46 to be less critical to the performance of the easy entry function of the seat. Therefore a relatively large pull will not cause the parts of the seat adjuster 9 to be pulled out of alignment, however a relatively short pull will still allow the seat adjuster 9 to continue to function. The above described over travel arrangement allows compensation for differences in tolerances in the parts or assembly of the adjuster 9 mechanisms or for the differences in length of the cable 46.

While a few of the embodiments of the present invention have been explained it will be readily apparent to those skilled in the art of the various modifications which can be made to the present invention without departing from the spirit and scope of this application as it is encompassed by the following claims.

The embodiments of the invention in which an exclusive property or privilege is claimed are defined as follows:

1. An easy entry vehicle seat adjuster slide having a plurality of preselectable positions, an easy entry position activated by a signal, a memory to return said seat from said easy entry position to a preselected position, said adjuster slide comprising in combination:
   a floor plate for mounting said seat to said vehicle;
   a top plate for attachment with said seat slidably mounted on said floor plate;
   a first latch connected with said top plate having a first position locking said top plate with said floor plate at a preselected position and a second position allowing relative movement between said floor plate and top plate;
   a memory bar alternately fixed with said top plate and said floor plate having a first and second surface; and a second latch connected with said top plate and activated by said signal, said second latch having first and second positions allowing said first latch to move to said first latch first and second positions respectively whereby said second latch in its first position is in contact with said memory bar first surface when said memory bar is fixed with said top plate and whereby said second latch in its second position is in contact with memory bar second surface when said memory bar is fixed with said floor plate.

2. An easy entry seat adjuster slide as recited in claim 1 wherein said memory bar has an indented first surface and a planar second surface and wherein said second latch has a pivotably mounted roller for contact with said memory bar first and second surfaces when said second latch is in said first and second positions respectively.

3. An easy entry vehicle seat adjuster slide having a plurality of preselectable positions, an easy entry position activated by a mechanical signal, a memory to return said seat from said easy entry position to a preselected position, said adjuster slide comprising in combination:

a floor channel for mounting said seat to said vehicle having a plurality of notched apertures along its length and also having mounting lugs at its opposite ends;

a seat channel for attachment with said seat slidably mounted on said floor channel;

a first latch connected with said seat channel being biased into a first locking position to engage with a preselected aperture of said floor channel and having a second position allowing relative movement between said floor plate and top plate and said first latch having a slot;

a memory bar alternately fixed with said seat channel and said floor channel mounted on said lugs having a first and second surface; and a second latch connected with said seat channel, said second latch being biased to a first position and activated by said mechanical signal to a second position, said second latch having a pin captured within said first latch slot allowing said first latch to move into said first latch first and second positions respectively in correspondence to the first and second positions of said second latch and whereby said second latch in said first position is in contact with said memory bar first surface when said memory bar is fixed with said seat channel and whereby said second latch in said second position is in contact with said memory bar second surface when said memory bar is fixed with said floor channel.

4. An easy entry car seat adjuster slide as described in claim 3 wherein said signal has an active area activating said second latch and a dwell area wherein further signaling does not cause said second latch to translate beyond said second position.

5. An easy entry vehicle seat adjuster slide having a plurality of preselectable positions wherein the vehicle seat automatically adjusts forward upon tilting of the vehicle seat back in a forward direction, said adjuster slide also having a memory to return said seat from said forward position to said preselected position, said adjuster slide comprising in combination:

a floor channel for mounting said seat with said vehicle having a plurality of notches along said floor channels length, and said floor channel having mounting lugs at said floor channel's opposite ends;

a seat channel for attachment with said seat slidably mounted on said floor channel;

a first latch connected with said seat channel being biased to a first position to engage with a notch of said seat channel at a preselected position, and said first latch having a second position allowing relative movement between said floor channel and said seat channel, said first latch also having a cammed surface slot;

a memory bar mounted on said mounting lugs alternatively fixed with said seat channel and said floor channel having a semicircular indention and a planar surface;

a cable mounted to said seat being translated by the tilting of said seat back; and a second latch connected with said seat channel having a cam follower captured within said first latch slot, and said second latch in a first biased position having a roller in contact with said memory bar semicircular indention when said memory bar is affixed to said seat channel and said latch in a second position having said roller in contact with said memory bar planar surface when said memory bar is affixed with said floor channel, and whereby said second latch is activated by said cable and the initial translation of said cable causes said second latch cam follower to move said first latch to said first latch second position and further translation of said cable does not cause further movement of said first latch.

* * * * *